United States Patent [19]

Ward et al.

[11] Patent Number: 4,663,413

[45] Date of Patent: May 5, 1987

[54] POLYSILOXANE-POLYLACTONE BLOCK COPOLYMERS

[75] Inventors: Robert S. Ward, Lafayette; Judy S. Riffle, Oakland, both of Calif.

[73] Assignee: Thoratec Laboratories Corp., Berkeley, Calif.

[21] Appl. No.: 688,788

[22] Filed: Jan. 4, 1985

[51] Int. Cl.$^4$ .................... C08G 77/42; C08G 81/00
[52] U.S. Cl. .................................. 528/26; 525/415; 525/475; 525/411
[58] Field of Search .................. 528/26; 525/415, 474

[56] References Cited

U.S. PATENT DOCUMENTS

| | | | |
|---|---|---|---|
| 3,169,945 | 2/1965 | Hostettler et al. | 528/354 |
| 3,691,257 | 9/1972 | Kendrick et al. | 525/474 |
| 3,701,815 | 10/1972 | Matzner et al. | 528/26 |
| 3,778,458 | 12/1973 | Morehouse | 528/41 |
| 3,897,513 | 7/1975 | Sundet | 525/415 |
| 4,277,595 | 7/1981 | Deichert et al. | 525/479 |
| 4,613,641 | 9/1986 | Haubennestel et al. | 528/26 |

FOREIGN PATENT DOCUMENTS 0207922  11/1984  Japan .................................... 528/26

*Primary Examiner*—Wilbert J. Briggs, Sr.
*Attorney, Agent, or Firm*—Flehr, Hohbach, Test, Albritton & Herbert

[57]     ABSTRACT

Novel linear polysiloxane-polylactone block copolymers are useful as surface modifying additives due in part to their miscibility with a wide variety of base polymers. A particularly preferred polysiloxane-polycaprolactone linear blocked copolymer is miscible with nylon and is useful for forming surface modified nylon products.

5 Claims, No Drawings

POLYSILOXANE-POLYLACTONE BLOCK COPOLYMERS

The present invention relates to linear polysiloxane-polylactone block copolymers. A lactone is reacted with a linear, hydroxy or amino-terminated polysiloxane oligomer in the presence of a catalyst.

BACKGROUND OF THE INVENTION

U.S. Pat. No. 3,778,458 discloses lactone-silicone block copolymers useful as surfactants and/or as foam stabilizers in the manufacture of foamed, cellular polyurethane materials. The copolymers described therein appear to be non-linear graft structures which apparently are not readily modifiable to form thermoplastic or linear block copolymers. The purpose of the foam stabilizer as taught in that patent is to assist in the production of foam during the formulation to the foam composition and to prevent the collapse of the foam until the foam product has developed sufficient gel strength to become self-supporting.

U.S. Pat. No. 3,372,356 discloses organosiloxane polyamide block copolymers alleged to be useful as additives to nylon products to impart a lower coefficient of friction to the nylon and to impart improved bonding characteristics of the nylon to glass.

French Pat. No. 2,168,221 apparently discloses the production of polycaprolactone-polysiloxane blocks by reacting an isocyanate-terminated polycaprolactone with a siloxane. However, the chemistry as described in the French patent would not appear to result in the described products.

None of the additives disclosed in the above-discussed patents are disclosed as being useful for modifying the surface properties of a variety of other polymers (base polymers) when used in blends. Furthermore, none of the additives disclosed in these patents may be permanently incorporated into a linear polymer system useful for modifying surface properties of that system. Therefore, there is a need to discover additives which can be used to blend with base polymers, which base polymers have known and desirable physical and bulk characteristics for specific purposes, but which have surface properties, which for one or more reasons, render them impractical or useless for other applications. For example, there are many polymers which have physical and bulk properties which would render them useful for prosthetic devices, catheters, or other items which could be implanted in the human body. However, the surface characteristics of most polymers are not compatible over a long term in a biological environment, such as when in constant contact with blood. Another example of this problem is in the field of water repellent synthetic textiles for recreation or industrial clothing. While most synthetic polymers are hydrophobic, and therefore the coatings would repel water, it would also be desirable for the textile to have sufficient anti-blocking characteristics to provide facile slippage of one piece of fabric over another. There are many other examples where the bulk and physical characteristics of a particular polymer might make it desirable for certain uses, particularly in view of the fact that most polymers are relatively inexpensive to make compared to other construction materials, but where the polymers are rendered inapplicable due to their surface properties.

It is therefore an object of the present invention to provide a novel class of linear polysiloxane-polylactone block copolymers which may be used as additives to modify other polymers (base polymers) rendering a blend thereof useful for various applications.

It is another object to provide novel linear polysiloxane-polylactone block copolymers which are useful as prepolymers for chemical incorporation in situ into base polymers during polymerization to form such base polymers.

The present invention describes linear polysiloxane-polylactone block copolymers which are useful as surface modifying additives when blended with polyurethanes, polyureas, polyvinylchloride, polyamides, epoxy or phenoxy resins, polyesters, polyester-polyether copolymers acrylonitrile-butadiene-styrene (ABS) and styrene-acrylonitrile (SAN) resins, polycarbonates, styrene-maleic anhydride copolymers, polymethyl methacrylates, polyolefins, and many other polymeric materials. The linear polysiloxane-polylactone block copolymers of the present invention may also, for example, be further reacted with diisocyanates and other commonly employed polyether or polyester soft segments, and with low molecular weight diols or diamines to produce segmented, thermoplastic polyurethanes (ureas).

Also, the block copolymers according to the present invention can be reacted into epoxy resins cured with anhydrides through pre-reacting the linear block copolymers with the anhydride. These are useful as surface-modifying additives and to decrease water uptake in the epoxy resins. Furthermore, the copolymers according to the present invention can be reacted into polyamides derived from ε-caprolactam through pre-reacting the linear block copolymers with a diisocyanate to provide useful surface-modifying additives. Additionally, the copolymers according to the present invention are useful as additives to polyethylene terephthalate to increase the crystalization rate.

SUMMARY OF THE INVENTION

The present invention provides a novel class of polysiloxane-polylactone copolymers useful in producing miscible blends with a large variety of polymers. This class of copolymers is also useful as precursors for further reaction to form preformed oligomers into thermoplastic or thermoset block copolymers. Other uses include that of nucleating agents, mold releasing agents for releasing molded products from the molds, and as epoxy network modifiers to modify the surfaces of epoxy resins to alter their coefficients of friction, to decrease water sorption, and/or to improve toughness.

The linear polysiloxane-polylactone block copolymers of the present invention have the following general formula (I).

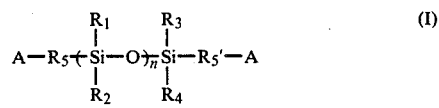

wherein n is an integer from 1 to about 200; $R_1$, $R_2$, $R_3$ and $R_4$ are independently linear or branched alkyl, alkenyl, haloalkyl, or haloalkenyl of 1 to 6 carbon atoms; aryl of 5 to 7 carbon atoms; aralkyl of 6 to 8 carbon atoms;

A and A' are independently

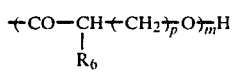

p is an integer from 0 to 6; m is an integer from 1 to about 250; $R_6$ is hydrogen or linear or branched alkyl of 1 to 6 carbon atoms;

$R_5'$ is

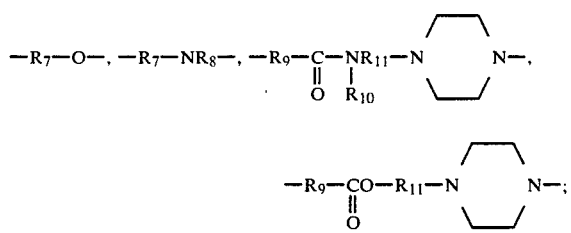

$R_5$ is

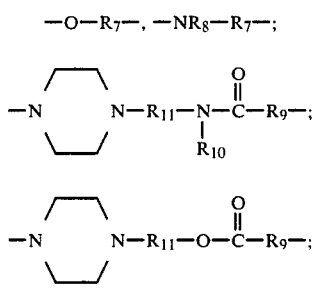

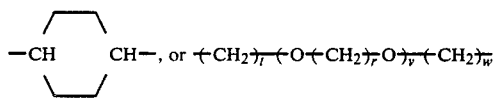

$R_7$, $R_9$ and $R_{11}$ are independently $+CH_2+_q$, q is an integer from 1 to 20;

where r, t and w are independently integers from 1 to 6 and v is an integer from 1 to about 100; $R_8$ and $R_{10}$ are independently hydrogen or alkyl of 1 to 6 carbon atoms.

GENERAL DESCRIPTION OF THE INVENTION

It has been found that linear block copolymers having the above-described formula I are unexpectedly miscible with a wide variety of polymers, and in particular, with a wide variety of commercially and industrially important polymers. The linear block copolymers according to the present invention, when blended with a base polymer, will not significantly alter the bulk and physical properties of the base polymer but will impart desirable and controllable surface properties to the base polymer.

The linear copolymers according to the present invention are characterized as block copolymers. By the term block is meant that there is at least one repeating monomeric unit in the copolymer which repeats on the order of about 10 to 200 times. In particular, this means that in the formula given above, either n, m, or v must be of a magnitude sufficient to define a block.

Referring to the formula above, $R_1$, $R_2$, $R_3$ and $R_4$ are independently linear or branched alkyl, alkenyl, haloalkyl or haloalkenyl of 1 to 6 carbon atoms, aryl of 5 to 7 carbon atoms or aralkyl of 6 to 8 carbon atoms. Exemplary alkyl groups are methyl, ethyl, propyl, isopropyl, butyl, and the like. Exemplary alkenyl groups are ethenyl, 1-prop-2-enyl, and the like. For the haloalkyl and haloalkenyl groups, the halo group is preferably fluoro. Illustrative haloalkyl groups are trifluoromethyl 1,1,2,2-tetrafluoroethyl, and the like. Representative haloalkenyl groups are 1,2-difluoroprop-1-enyl, and the like. Illustrative aryl groups are phenyl and substituted-phenyl. Representative aralkyl groups are benzyl, 2-phenylethyl, and the like. Preferably $R_1$, $R_2$, $R_3$ and $R_4$ are alkyl of 1 to 6 carbon atoms. Most preferably, $R_1$, $R_2$, $R_3$ and $R_4$ are methyl.

The moieties A and A' are derived from a lactone which is used as a starting material for forming the copolymers of the present invention. Thus, if an ε-caprolactone is used as a starting material, then p in the formulas A and A' will be 4 and $R_6$ will be hydrogen. This is the preferred moiety for A and A'. The group $R_6$ may, however, be other linear or branched alkyl groups of 1 to 6 carbon atoms, such as methyl, ethyl, isopropyl, propyl and the like. The integer m may be of a magnitude which describes a block as described above, however, if there is at least one other block in the copolymer, then m may be as low as 1.

A preferred class of compounds are those in which $R_5$ and $R_5'$ are the groups $—R_7—O—$. The group $R_7$ may be a linear alkylene group $—(CH_2)—_q$, where q is an integer from 1 to 20; or $R_7$ may be cycloalkylen-1,4-yl, or a linear polyalkylene ether of th formula $—(CH_2)_r—(—O—)CH_2)_r—O—)_v—(CH_2)_w—$, where r, t and w are independently integers from 1 to 6 and v is an integer from 1 to about 100. Preferably, $R_7$ is a linear alkylene group wherein 2 is an integer from 1 to 20. A second class of preferred $R_5$ and $R_5'$ groups are $—R_7—NR_8—$. The group $R_7$ will be as defined above. The compounds where $R_7$ is a linear alkylene group wherein q is an integer from 1 to 20 is preferred. The substituent $R_8$ may be hydrogen or alkyl of 1 to 6 carbon atoms, such as methyl, ethyl, isopropyl, n-propyl, butyl, t-butyl and the like. Preferably, $R_8$ is hydrogen.

The groups $R_5$ and $R_5'$ may also be

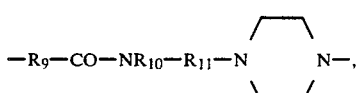

wherein $R_9$ and $R_{11}$ are defined as the same group of substituents for $R_7$ above. The group $R_{10}$ may be hydrogen or alkyl of 1 to 6 carbon atoms such as methyl, ethyl, isopropyl, n-propyl, t-butyl and the like. Preferably $R_{10}$ is hydrogen and $R_9$ and $R_{11}$ are independently linear alkylene groups wherein q is an integer from 1 to 20.

The polysiloxane-polylactone copolymers according to the present invention may be formed by the reaction of the lactone with a polysiloxane oligomer, respectively shown in formulas II and III below.

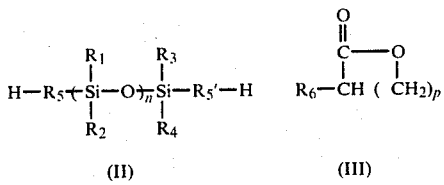

The preformed oligomer (II) will be terminated with either hydroxyl or amine end groups. The degree of polymerization to form the block copolymers according to the present invention may be controlled by the ratio of the number of moles of the lactone monomer (III) to the functional end groups on the prepolymer (II). The weight percent composition of the block copolymers according to the present invention will be determined by the weight percent of lactone monomer (III) used relative to the weight percent of preformed oligomer (II).

The block copolymers according to the present invention may be formed by the reaction of the lactone (III) with a polysiloxane oligomer (II) in the presence of a catalyst. An anhydrous lactone (III) and the oligomer (II) will be treated in a reaction vessel in the absence of a solvent, in most cases, and in the presence of a catalyst at a temperature usually in the range of about 50° to 200° C., preferably in the range of about 70° to 180° C., and most preferably in the range of about 70° to 140° C., for a period of time sufficient to effect the polymerization. Optionally, a solvent for the monomer (III) and/or oligomer (II) may be employed to control viscosity and/or reaction rate.

Methods for forming the oligomers (II) are well known and may be readily prepared by those of ordinary skill in the art. For example, see McGrath et al., *Polym. Mater. Sci. Eng.* (1984), 50, 518–22; Sormani et al., *Polym. Prep.* (1984), 25 (1), 227–9; McGrath, J. E., Riffle, J. S., Banthia, A. K., Yilgor, I. and Wilkes, G. L., ACS Symposium Series No. 212, *Initiation of Polymerization* (1983), 145–72; and Yilgor et al., *Polym. Bull.* (1982), 8 (11–12), 535–42.

The linear block copolymers according to the present invention may be used as surface modifying additives when blended with various types of base polymers, such as polyurethanes, polyureas, polyvinylchloride, polyamides, epoxy or phenoxy resins, polyesters, polyesterpolyether copolymers acrylonitrile-butadiene-sytrene (ABS), styrene-acrylonitrile (SAN) resins, polycarbonates, styrene-maleic anhydride copolymers, polymethyl methacrylates, polyolefins, polylactones, and the like. Also the linear block copolymers according to the present invention may be reacted with diisocyanates and other commonly employed polyether and polyester soft segments together with low molecular weight diols or diamines to produce segmented, thermoplastic polyurethanes. Such segmented, thermoplastic polyurethanes may be used as additives for modifying surface properties of base polymers, or may be used alone to form products having desirable surface properties. Also, the block copolymers according to the present invention can be reacted into epoxy resins cured with anhydrides through pre-reacting the linear block copolymers with the anhydride. These are useful as surface-modifying additives and to decrease water uptake in the epoxy resins. Furthermore, the copolymers according to the present invention can be reacted into polyamides derived from ε-caprolactam through pre-reacting the linear block copolymers with a diisocyanate to provide useful surface-modifying additives. Additionally, the copolymers according to the present invention are useful as additives to polyethylene terephthalate to increase the crystalization rate.

For example, the polymers according to the present invention may be used as nucleating agents, or as mold releasing interfaces between a molded polymer product and mold. The polymers according to the present invention may also be used to modify epoxy networks in order to modify their surface coefficients of friction, to decrease their water uptake, or to rubber-toughen these networks. The polymers according to the present invention are also useful as modifiers for polyvinylchloride and nylon to impart desirable surface characteristics to those polymers.

The results above demonstrate that linear block copolymers having polysiloxane and polylactone segments can be prepared. The resulting materials are demonstrated to be useful in blends with a variety of commercially available homopolymers, including nylon, for the surface modification thereof. Additionally, the block copolymers described herein can be chemically incorporated into thermoplastic systems such as, but not limited to, segmented polyurethanes, polyureas, and nylon, and into thermoset systems such as anhydride cured epoxy resins.

To prepare polymers having modified surface properties, various methods may be utilized. For example, a base polymer may be melt blended using as an additive a copolymer according to the present invention.

Alternatively, the copolymer according to the present invention may be added to the monomeric materials from which the base polymer will be formed. Then, by polymerizing the monomeric materials of the base polymer in the presence of the additive according to the present invention, a physical mixture of a base copolymer and an additive will be formed. This latter method may be used for forming a surface modified nylon wherein the monomer materials for forming nylon are polymerized in the presence of a linear block copolymer according to the present invention. This method is also the preferred method for forming surface modified amine cured epoxy resins. For nylon, a preferred class of additives comprise those of formula (I) wherein $R_5'$ is $-R_7O-$, $R_5$ is $-OR_7-$, and $R_7$ is $+CH_2+_q$.

By a third method, a polysiloxane/polylactone block copolymer may be used as a prepolymer so that, when mixed with monomeric materials of the base polymer during polymerization of the base polymer, the block copolymer is chemically incorporated into the base polymer. Thus, by mixing block copolymers of formula (I) with monomer starting materials for the base polymer which also react with the ends of the block copolymers, such as, diisocyanates and low molecular weight diols and/or diamines or anhydrides, the block copolymers may be chemically bonded to the base polymer. This is a preferred method for forming modified polyurethanes or polyurea/urethanes where the block copolymer is chemically linked to the base polymer by urethane or urea groups. It is also a preferred method for preparing anhydride cured epoxy resins and for modification of cast nylon. Particularly preferred prepolymers are those of formula (I) wherein $R_5'$ is $-R_7O-$, $R_5$ is $-OR_7-$ and $R_7$ is $-CH_2-_q$.

The advantages of the polymers according to the present invention may be more readily appreciated by reference to the following examples.

EXAMPLE 1

20.4 of distilled ε-caprolactone and 4.0 g of a hydroxybutyl terminated polydimethylsiloxane of an $\overline{M}n$ of 2300 g/mole by titration were charged to a reaction vessel under dry nitrogen and heated to 150° C. 0.03 g of stannous octanoate was added and the 150° C. temperature was maintained for two hours with mechanical agitation. It was observed that the reaction mixture was opaque at the beginning of the reaction and that after 40 minutes, the solution cleared. Within the two hour reaction time, the polymer became very viscous and the monomer had disappeared as evidenced by GPC. The reaction mixture was allowed to cool to room temperature where it was transformed to a hard, crystalline, opaque solid very light in color. GPC showed the number average molecular weight of the block copolymer to be 16700 g/mole. Differential scanning calorimetry showed a Tm of 59° C. corresponding to the polycaprolactone blocks. The material was analyzed for composition by NMR and was found to be 16 weight percent polysiloxane and 84 weight percent polycaprolactone.

EXAMPLE 2

18 g of distilled ε-caprolactone and 18 g of a hydroxybutyl terminated polydimethylsiloxane of an Mn of 2300 g/mole by titration were charged to a reaction vessel under dry nitrogen and heated to 75° C. 0.045 g stannous octanoate was added and the 75° C. temperature was maintained for three hours. Subsequently the temperature was held at 140° C. for three hours. It was observed that the reaction mixture was an opaque, immiscible blend at the start of the reaction which progressively became clearer during the high temperature step. The resulting product was a clear, viscous, melt which cooled to a hard, opaque, solid. GPC showed a Gaussian shaped unimodal curve corresponding to a low molecular weight polymer. Differential scanning calorimetry showed a Tg at −119° C. corresponding to the polydimethylsiloxane segment and a Tm at 60° C. corresponding to the polycaprolactone blocks. The material was analyzed for composition using proton NMR and was found to be 50 weight percent polysiloxane and 50 weight percent polycaprolactone.

EXAMPLE 3

20 g of distilled ε-caprolactone and 4 g of an aminopropyl terminated polydimethylsiloxane of an $\overline{M}n$ of 2300 g/mole by titration were charged to a reaction vessel under dry nitrogen and heated to 75° C. 0.03 g stannous octanoate was added and the 75° C. temperature was maintained for two hours. Subsequently, the temperature was increased to 140° C. and held at that temperature for an additional two hours. It was observed that the reaction mixture was a colorless, opaque, immiscible mixture at the start of the reaction. During the low temperature step, the material began to clear and turned a light yellow color. During the high temperature step, the mixture continued to become clear. The final product was a clear, viscous, light yellow melt which cooled to a hard, opaque solid. GPC showed the number average molecular weight of the product to be 19000 g/mole. Differential scanning calorimetry showed a Tm of 60° C. corresponding to the polycaprolactone segments. The product was analyzed for composition by proton NMR and was found to be 15 weight percent polydimethyl-siloxane and 85 weight percent polycaprolactone.

EXAMPLE 4

To a nitrogen purged reaction vessel equipped with a condenser and a magnetic stirring bar and heated with a silicone oil bath, charge 50 g (0.049 moles) of an aminopropyl terminated polydimethylsiloxane and 22.24 g (0.195 moles) ε-caprolactone and heat to 140° C. Maintain the temperature for 2 hours. Strip the excess ε-caprolactone monomer from the reaction mixture at 110° C. and approximately 1 torr. This yields a yellow oil (65.7 g) essentially free from amine groups by titrartion. The IR spectrum prominently shows the appearance of amide I and II bands at 1650 cm$^{-1}$ and 1545 cm$^{-1}$, respectively.

EXAMPLE 5

19.4 g (0.17 moles) dry caprolactam and 0.1430 g ($3.5 \times 10^{-3}$ moles NaH) of a 55–60% dispersion of NaH in mineral oil were charged to a reaction vessel under dry nitrogen at 112° C. 19.8 g (0.175 moles) dry caprolactam, 0.50 ml ($3.5 \times 10^{-3}$ moles) toluene diisocyanate and 0.8 g (approximately $1.7 \times 10^{-4}$ moles) of a difunctional, linear, hydroxyl terminated polysiloxane/polycaprolactone block copolymer (A-B-A architecture, 50% polysiloxane/50% polycaprolactone) were charged to a second reaction vessel under dry nitrogen at 77° C. Each mixture was allowed to react at the respective temperatures for ½ hour. Each mixture remained transparent throughout the ½ hour period. After the ½ hour of reaction, the two mixtures were mixed and charged to a third reaction vessel at 160° C. The 160° C. temperature was maintained for one hour. The final reaction mixture was initially transparent and became opaque as polymerization proceeded.

EXAMPLE 6

16.8 g (0.15 moles) dry caprolactam and 0.1463 g ($3.5 \times 10^{-3}$ moles NaH) of a 55–60% dispersion of NaH in mineral oil were charged to a reaction vessel under dry nitrogen at 112° C. 18.0 g (0.16 moles) dry caprolactam, 0.50 ml ($3.5 \times 10^{-3}$ moles) toluene diisocyanate and 1.45 g (approximately $3.15 \times 10^{-4}$ moles) of a difunctional, linear, hydroxyl terminated polysiloxane/polycaprolactone block copolymer (A-B-A architecture, 50% polysiloxane/50% polycaprolactone) were charged to a second reaction vessel under dry nitrogen at 77° C. Each mixture was allowed to react at the respective temperatures for ½ hour. Each mixture remained transparent throughout the ½ hour period. After the ½ hour of reaction, the two mixtures were mixed and charged to a third reaction vessel at 160° C. The 160° C. temperature was maintained for ½ hour. The final reaction mixture was initially transparent and became opaque as polymerization proceeded.

EXAMPLE 7

18.3 g (0.16 moles) dry caprolactam and 0.1710 g ($4.1 \times 10^{-3}$ moles NaH) of a 55–60% dispersion of NaH in mineral oil were charged to a reaction vessel under dry nitrogen at 112° C. 19.3 g (0.17 moles) dry caprolactam, 0.50 ml ($3.5 \times 10^{-3}$ moles) toluene diisocyanate and 4.50 g (approximately $9.8 \times 10^{-4}$ moles) of a difunctional, linear, hydroxyl terminated polysiloxane/polycaprolactone block copolymer (A-B-A architecture, 50% polysiloxane/50% polycaprolactone) were charged to a second reaction vessel under dry nitrogen at 77° C. Each mixture was allowed to react at the respective temperatures for $\frac{1}{2}$ hour. Each mixture remained transparent throughout the $\frac{1}{2}$ hour period. After the $\frac{1}{2}$ hour of reaction, the two mixtures were mixed and charged to a third reaction vessel at 160° C. The 160° C. temperature was maintained for one hour. The final reaction mixture was initially transparent and became opaque as polymerization proceeded.

EXAMPLE 8

A round-bottomed flask equipped with a nitrogen inlet and drying tube is charged with 3 g ($4.24 \times 10^{-4}$ moles) of a polydimethylsiloxane/polycaprolactone block copolymer (36% polysiloxane) and 1.50 ml ($1.05 \times 10^{-2}$ moles) toluene diisocyanate. This mixture is reacted at 85°–95° C. with agitation for $\frac{1}{2}$ hour. Then 26.3 g (0.233 moles) dried caprolactam is added and the same temperature is maintained for $\frac{1}{2}$ hour more. The reaction mixture should remain clear and homogeneous throughout the time period. Meanwhile, a second round-bottomed flask equipped with a nitrogen inlet and drying tube is charged with 24.76 g (0.219 moles) dried caprolactam and 0.52 g (approx. 0.012 moles sodium hydride) of a 55–60% sodium hydride dispersion in mineral oil. This mixture is reacted at 85°–95° C. for $\frac{1}{2}$ hour. Subsequently, the two reaction mixtures are combined and reacted in a preheated mold for 1 hour at 165° C. A clear, homogeneous solution is obtained upon combination of the two reaction mixtures which solidifies to a crystalline solid upon reaction of the $\epsilon$-caprolactam.

EXAMPLE 9

A flask equipped with nitrogen flow and a drying tube is charged with 1 g ($4.38 \times 10^{-4}$ moles) of a linear, hydroxybutyl-terminated polydimethylsiloxane oligomer and 1.5 ml ($1.05 \times 10^{-2}$ moles) toluene diisocyanate. This mixture is reacted for $1\frac{1}{2}$ hours at 90°–95° C., to produce a clear, homogeneous reaction mixture. Then 29.75 g (0.263 moles) dried $\epsilon$-caprolactam monomer is added. This mixture remained nonhomogeneous up to 130° C. for 6 hours. This example shows that polysiloxane oligomers capped with toluene diisocyanate are immiscible with $\epsilon$-caprolactam monomer and, hence, cannot be used to modify poly($\epsilon$-caprolactam) via this procedure.

EXAMPLE 10

17.60 g (70.3 mmoles) 4,4'-diphenylmethane diisocyanate, 99.67 g (48.7 mmoles) polytetra-methylene oxide, 2.43 g (1.5 mmoles) of the caprolactone capped polydimethylsiloxane of EXAMPLE 4 and 250 ml dimethylformamide were charged to a resin kettle equipped with a mechanical agitator, nitrogen inlet, dropping funnel, and condenser with a drying tube. The reaction mixture was heated to 45° C. and the temperature was maintained for $1\frac{1}{2}$ hours. The clear, colorless solution became viscous over the $1\frac{1}{2}$ hour period.

The heat was subsequently removed and the mixture was diluted with 450 ml additional dimethylformamide. 1.21 g (20.2 mmoles) ethylene diamine was weighed into 28 ml dimethylformamide in the addition funnel and this solution was added slowly to the prepolymer mixture over approximately $\frac{1}{2}$ hour. The reaction was agitated for 1 hour following the final ethylene diamine addition. A clear, colorless, viscous solution resulted.

A transparent film cast from this solution showed an initial modulus of $722 \pm 23$ psi, a tensile strength of $5577 \pm 140$ psi, and an elongation at break of $941 \pm 17\%$.

EXAMPLE 11

To a nitrogen purged flask is added 50 g (0.025 moles) polytetramethylene oxide. 30 g (0.004 moles) of a polysiloxane/polycaprolactone block copolymer (36% polysiloxane by weight), 10.21 g p,p'-diisocyanatodiphenylmethane (0.041 moles), and 100 ml dry dimethylformamide. The mixture is heated to 85°–100° C. and maintained at that temperature with agitation over a 1-hour period. Subsequently, the reaction mixture is allowed to cool to 30°–40° C., then 300 ml additional DMF is added. Immediately following the DMF charge, 0.53 ml (0.008 moles) ethylene diamine is added. The remaining 0.25 ml (0.0037 moles) ethylene diamine is then added incrementally over a 40-minute period. This yielded a transparent elastomeric polyurethane(urea) with an initial modulus of $313 \pm 20$ psi, a tensile strength of $1816 \pm 95$ psi and an ultimate elongation of $1480 \pm 49\%$.

Two other polysiloxane/polyurethane(urea) block copolymers were synthesized under similar conditions except the mole ratios shown in Table 1 were used. Corresponding mechanical properties of the resulting polymers are also given in Table 1.

TABLE 1

| PTMO[1] | PSX-PCL[2] | MDI[3] | ED[4] | Initial Modulus (psi) | Tensile Strength (psi) | Ultimate Elongation (%) |
|---------|------------|--------|-------|----------------------|------------------------|-------------------------|
| 0.01975 | 0.00353    | 0.04361 | 0.02033 | 791 ± 49 | 4968 ± 173 | 1046 ± 32 |
| 0.01728 | 0.00353    | 0.05946 | 0.03865 | 2772 ± 189 | 5833 ± 200 | 1001 ± 4 |

[1] PTMO = polytetramethylene oxide
[2] PSX-PCL = polysiloxane/polycaprolactone block copolymer
[3] MDI = p,p'-diisocyanatodiphenylmethane
[4] ED = ethylene diamine

EXAMPLE 12

A round-bottomed flask equipped with a nitrogen purge and drying tube is charged with 7.5 g ($1.06 \times 10^{-3}$ moles) of a polysiloxane/polycaprolactone block copolymer, 7.5 g (0.051 moles) phthalic anhydride, and 10 ul N,N-dimethylbenzylamine. The mixture is reacted at 120° C. for 4 hours. Meanwhile, 25 g (approx. 0.066 moles) Shell Epon resin 828 and 12.25 g (0.083 moles) phthalic anhydride is heated to 130° C. in a separate container and agitate this mixture until it forms a homogenous melt. The two reaction mixtures are combined with 40 ul N,N-dimethylbenzylamine catalyst and immediately transferred to a mold. The composition is cured for 2 hours at 120° C., then for 4 hours at at 143° C. The thermoset product was yellow in color and clear. It released from an aluminum mold easily without the use of an external mold release.

EXAMPLE 13

A round-bottomed flask is charged with 3 g ($1.31 \times 10^{-3}$ moles) of a linear, hydroxybutyl-terminated polydimethylsiloxane, 7.5 g (0.051 moles) phthalic anhydride, and 10 ul N,N-dimethylbenzylamine catalyst. The reaction mixture was immiscible. This example shows that this reaction does not work if a polydimethylsiloxane oligomer is used as the oligomeric modifier.

EXAMPLE 14

Isothermal differential scanning calorimetry scans were run on both unmodified polyethylene terephthalate and on polyethylene terephthalate modified with 6.67% of a polysiloxane/polycaprolactone block copolymer of a weight composition of 16% polysiloxane/84% polyester. Each sample was heated at 20 K./minute to 550 K. and held isothermally at 550 K. for 10 minutes in order to remove any effects due to previous thermal history. Each was then cooled at 160 K./minute to b 471 K. where isothermal crystallization rates were measured. Both samples reached the same maximum crystalization levels but the rates were differed. The unmodified sample underwent two crystalization stages. The primary step occurred over a 45-second period and accounted for approximately 44% of the maximum level of crystallinity. The secondary stage was much slower. The time to 85% of maximum crystallinity was 203 seconds, full crystallinity was developed in 308 seconds. By contrast, the polysiloxane/polycaprolactone modified material only showed one crystallization stage reaching 85% of its maximum value in 83 seconds and maximum crystallinity in 262 seconds. This example shows that the addition of a polysiloxane/polycaprolactone block copolymer modifier to polyethylene terephthalate increases the crystallization rate of polyethylene terephthalate.

What is claimed is:

1. A linear polysiloxane-polylactone block copolymer having the formula:

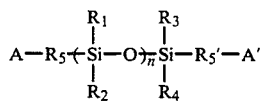

wherein n is an integer from 1 to about 200; $R_1$, $R_2$, $R_3$ and $R_4$ are independently linear or branched alkyl, alkenyl, haloalkyl, or haloalkenyl of 1 to 6 carbon atoms; aryl of 5 to 7 carbon atoms; aralkyl of 6 to 8 carbon atoms;

A and A' are independently

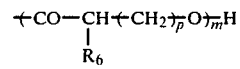

p is an integer from 0 to 6; m is an integer from 1 to about 250; $R_6$ is hydrogen or linear or branched alkyl of 1 to 6 carbon atoms;

$R_5'$ is

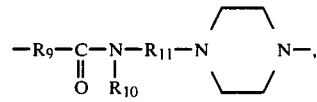

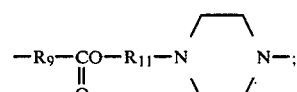

$R_5$ is

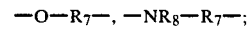

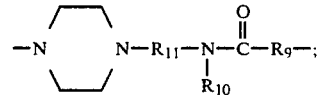

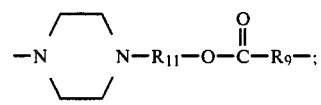

$R_7$, $R_9$ and $R_{11}$ are independently $-(CH_2)_q-$
q is an integer from 1 to 20;

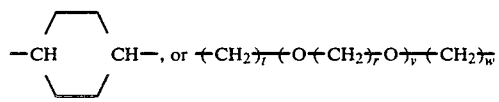

where r, t and w are independently integers from 1 to 6 and v is an integer from 1 to about 100;
$R_8$ and $R_{10}$ are independently hydrogen or alkyl of 1 to 6 carbon atoms.

2. A block copolymer according to claim 1 wherein $R_5'$ is $-R_7-O-$;
$R_5$ is $-O-R_7-$;
$R_7$ is $-(CH_2)_q-$.

3. A block copolymer according to claim 2 wherein $R_6$ is hydrogen and p=4.

4. A block copolymer according to claim 1 wherein $R_5'$ is $-R_7-NR_8-$;
$R_5$ is $-NR_8-R_7-$;
$R_7$ is $-(CH_2)_q-$.

5. A block copolymer according to claim 4 wherein $R_6$ and $R_8$ are hydrogen and p=4.

* * * * *